IDENTIFICATION CIRCUIT FOR PHASE ALTERNATING LINE SYSTEM OPERATION OF COLOR VIDEO TAPE RECORDERS

Filed Oct. 19, 1967

INVENTORS
Peter S. Carnt &
Theodore E. Bart

BY William H. Meagher
ATTORNEY 3,538,244

IDENTIFICATION CIRCUIT FOR PHASE ALTERNATING LINE SYSTEM OPERATION OF COLOR VIDEO TAPE RECORDERS

Peter Swift Carnt, Herrliberg, Zurich, and Theodore Ernest Bart, Zurich, Switzerland, assignors to RCA Corporation, a corporation of Delaware Filed Oct. 19, 1967, Ser. No. 676,479
Claims priority, application Great Britain, Jan. 27, 1967, 4,210/67
Int. Cl. H04n 9/46
U.S. Cl. 178—5.4 6 Claims

ABSTRACT OF THE DISCLOSURE

A system in a color television signal recorder for sensing when the ATC mode of operation is incorrect due to out of phase switching of a reference subcarrier wave. Means are provided to reliably detect the incorrect ATC operating mode and to provide a signal to reset and thereby correct the phase switching of the reference subcarrier wave.

Figures 1, 2:
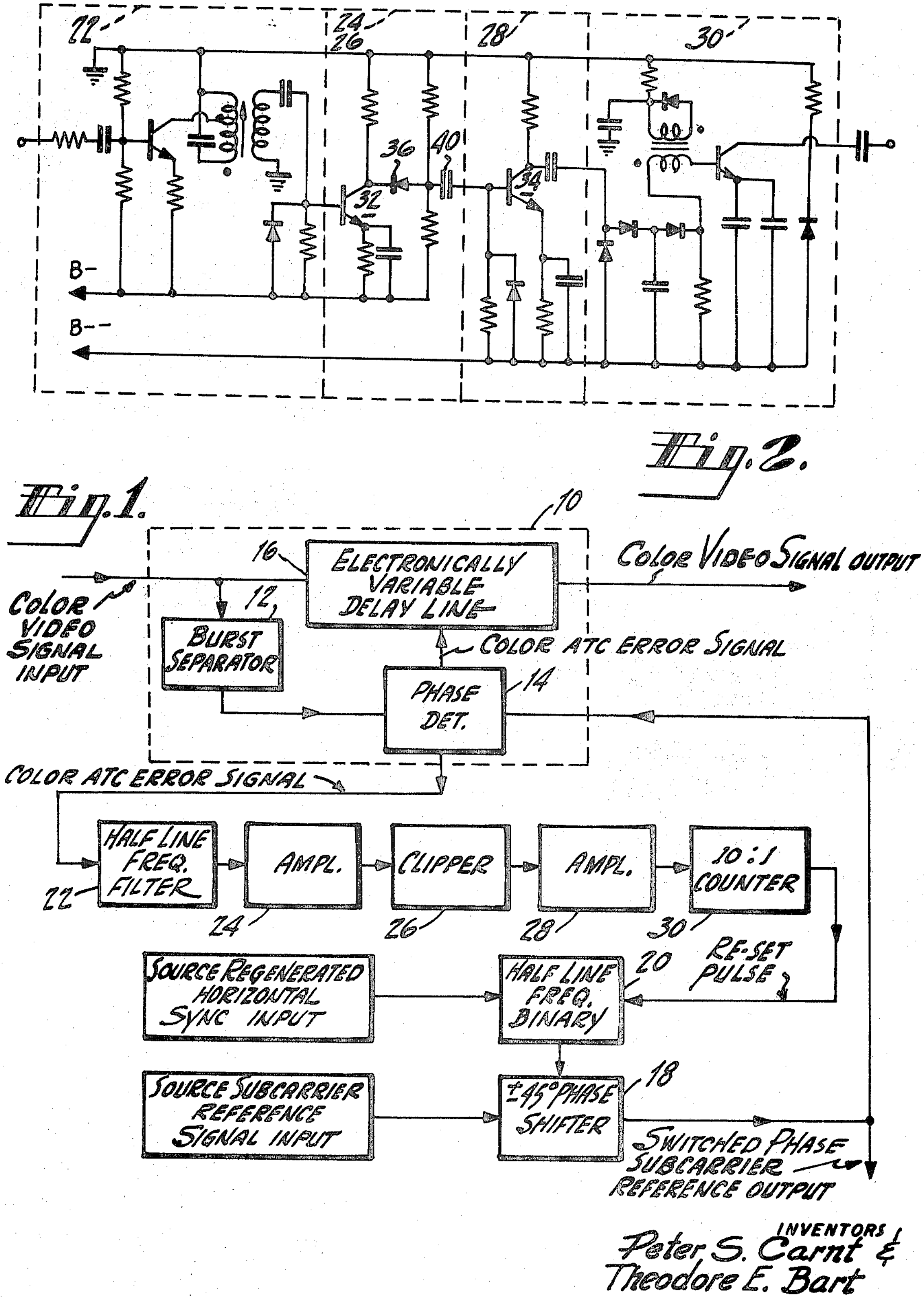

This invention relates to an identification circuit for phase alternating line (PAL) system operation of color video tape recorders.

Many existing color television recorders include automatic time correction (ATC) circuits for stabilizing the reproduced picture. The ATC circuitry measures the picture displacement from line-to-line as a function of time. In quadraplex recording, of an NTSC signal, for example, using an NTSC type recorder Model TR–70 manufactured by the Radio Corporation of America, the timing errors, which are caused by nonuniformities in the mechanical motion of the machine, are sensed by comparing the recorded color burst signal with a locally generated reference wave at the burst frequency. The resultant error signal is used to control a variable delay line, through which the recorded color signal is passed, to correct for the timing errors.

In the PAL system for transmitting color television information, the color burst signal is varied from line-to-line by a ±45° from a reference phase. In order to use the aforementioned NTSC type ATC circuits in the recording of PAL type signals it is necessary that the locally generated color reference wave be shifted in phase line-by-line to match the cyclic phase shift of the recorded PAL color burst. It is also necessary that the sense of this cyclic phase shift of the locally generated color signal bear a prescribed relationship with the sense of the phase shift of the recorded PAL reference signal (i.e., when the PAL color reference signal phase is ±45°, the locally generated color reference signal should also be ±45° and not ∓45°, from the same reference phase).

If the ATC mode is incorrect, the recorded burst phase at ±45° is compared with a reference phase of ∓45° so that an apparent error of +90°, −90°, +90°, etc., occurs from line-to-line. The color ATC error signal therefore includes a square wave having a frequency equal to half that of the horizontal scan frequency (half the line rate), when the ATC system is operating in the undesired mode.

The present invention takes advantage of the output color ATC error signal as a means for sensing when the ATC mode of operation is incorrect.

Accordingly, it is an object of the present invention to provide an identification circuit for distinguishing the half line frequency wave ATC error signal reliably in the presence of noise, dropouts, etc., and to trigger the ATC circuitry for operation in the correct mode.

Briefly described, the system of the present invention includes circuit means selectively responsive to both the subcarrier frequency component of a color television signal and a reference subcarrier signal for providing an output signal when the phase of the reference signal is cyclically out-of-phase with the phase of the television signal subcarrier frequency component. The output signal is then processed in a detector circuit which in response to a predetermined number of cycles of the signal provides a cyclic error determined pulse signal. The pulse signal is then applied to a circuit which in response thereto operates to reset the cyclic (periodic) phase of the reference subcarrier signal so as to synchronize it with the cyclic phase of the subcarrier frequency component of the color television signal.

The novel features which are considered to be characteristic of this invention are set forth with particularity in the appended claims. The invention itself, however, both as to its organization and method of operation as well as additional objects and advantages thereof, will best be understood from the following description when read in connection with the accompanying drawings in which:

FIG. 1 is a block diagram of a color ATC system incorporating the identification circuit of the present invention; and FIG. 2 is a detailed schematic diagram of the identification circuit portion of the block diagram shown in FIG. 1.

The identification system of the present invention will be described in the context of the color ATC system associated with an NTSC type color video tape recorder model TR–70 manufactured by the Radio Corporation of America. For details relating to the description and operation of said ATC system, reference may be had to Television Tape Machines Color Automatic Timing Correction MI40693, IB31652–P, published by the Radio Corporation of America, Broadcast and Communication Products, Camden, N.J., United States of America, and United States Pat. No. 3,202,769, granted to Charles H. Coleman, Jr. and entitled Apparatus for Modifying the Timing Characteristics of a Signal. Copies of the publication may be obtained from RCA, Commercial Electronics Systems Division, River and State Roads, Camden, N.J.

Referring now to FIG. 1, an illustrative color ATC system is shown in block form within the dashed rectangle 10. Under normal NTSC signal playback operation, the subcarrier burst frequency component of a recorded color video signal is separated therefrom by means of a separator 12 and then compared in a phase detector 14 with a locally generated reference wave at subcarrier frequency. The resultant error signal (ATC error signal) is used to control an electronically variable delay line 16 and thereby vary the delay imparted to the reproduced color video signal passing therethrough.

In accordance with the present invention and in order to adapt the ATC system to function properly with a recorded PAL signal, the subcarrier frequency reference signal is passed through a phase shifter 18 wherein it is alternately shifted ±45° at a rate corresponding to one half the horizontal synch scan frequency of the recorded color signal, i.e., one half the line rate. The shifter 18 is controlled by a half line frequency binary 20 which is triggered by a locally generated horizontal sync frequency reference signal normally available in the video recorder (not shown). Thus, the phase shifter 18 is operated at one half the horizontal line frequency so that the reference subcarrier wave frequency is shifted each line betwen the two phase conditions, i.e., alternately ±45°.

Referring now to the schematic drawing of FIG. 2 together with the block diagram of FIG. 1, it will be seen that the color ATC error signal (which will contain a large component of half line frequency signal when the ATC circuit is operating in the undesired mode) is first passed through a filter circuit 22 tuned to the half line error frequency (7.8 kHz. for a 625 line system). This circuit should have a Q of approximately 30 to insure adequate selectivity. After amplification in amplifier 24, the filtered half line frequency component is passed to a clipper stage 26 which allows an output to be obtained only when the input signal excursion exceeds a given amplitude. Thus, any spurious signals which are smaller in amplitude than the half line frequency component are excluded from the output of the clipper 26.

The output from the clipper 26 is then amplified in an amplifier 28 and then passed to a diode pump type divider or counter detector stage 30. The output of the detector 30 is a reset pulse which is coupled to the half line frequency binary 20. The detector 30 may be set to count approximately 10 pulses before firing, though the exact number of the count is not critical. The purpose of the detector 30 is to prevent accidental resetting of the half line frequency binary by any occasional spurious signals of large amplitude which may occur. In this type of detector, the counting number increases as the amplitude of the counter input signal decreases. Hence, the further the frequency of any spurious signal is away from half the horizontal scan frequency (i.e. one half the line rate) and because of the selectivity of the fiter 22, the lower is the amplitude of the resultant signal and the higher is the count number before the counter is fired and the half line frequency binary 20 is reset. This action reduces the danger of accidentally triggering the half line frequency binary (such as by noise pulses) since the circuit will produce a reset pulse only if its input signal has the following properties:

(1) A frequency corresponding to half the horizontal frequency.

(2) Sufficient amplitude.

(3) A duration of about 10 cycles or more

From the schematic circuit of FIG. 2 it will be noted that additional protection against accidental triggering of the counter is provided by maintaining transistors 32 and 34 in the clipper and amplifier stages in a zero or back bias condition when the binary mode is correct. Thus, a small spurious signal on the base of transistor 32, for example, will not appear at the transistor 32 collector electrode. When the binary mode is incorrect, however, the signal at the base of the transistor 32 should be sufficient to drive the transistor 32 into conduction. For this action, the diode 36 which couples the signal to the base of the transistor 34 acts as a D.C. restorer setting up a charge on the capacitor 40 which then drives the transistor 34 into conduction.

From the foregoing, it will be seen that an identification circuit has been provided for use with the color ATC system in a video recorder processing PAL system color video signals which is capable of sensing when the ATC mode of operation is incorrect due to out of phase switching of the reference subcarrier wave and having means for correcting same.

What is claimed is:

1. An identification circuit for use with an ATC system in a color television signal video recorder, said ATC system including a phase detector responsive to the periodically phase shifted at line rate subcarrier frequency burst component of a recorded color television signal and a line rate periodically phase shifted reference subcarrier frequency signal, comprising:
   - filtering means selectively responsive to signal components of the output of said phase detector having a frequency corresponding to one-half the line rate;
   - means coupled to the output of said filtering means for detecting the presence of a predetermined number of cycles of said half line rate frequency component signal and in response thereto providing an output signal; and
   - means responsive to said output signal and operative to effect synchronization of the sense of the periodic phase shift of said reference subcarrier frequency signal with that of the subcarrier frequency burst component of said recorded color television signal.

2. An identification circuit for use with an ATC system in a color television signal video recorder, said ATC system including a phase detector responsive to the periodically phase shifted at line rate subcarrier frequency burst component of a recorded color television signal and a line rate periodically phase shifted reference subcarrier frequency signal, comprising:
   - filtering means selectively responsive to signal components of the output of said phase detector having a frequency corresponding to one-half the line rate, said filtering means including means for amplifying said half line rate frequency component signal;
   - means coupled to the output of said filtering means for detecting the presence of a predetermined number of cycles of said half line rate frequency component signal and in response thereto providing an output signal; and
   - means responsive to said output signal and operative to effect synchronization of the sense of the periodic phase shift of said reference subcarrier frequency signal with that of the subcarrier frequency burst component of said recorded color television signal.

3. The identification circuit as defined in claim 2 and further including:
   - clipping means connected between said amplifying means and said detecting means for allowing said half line rate frequency component signal to be applied to said detecting means only when its amplitude exceeds a predetermined level.

4. An identification circuit for use with an ATC system in a color television signal video recorder, said ATC system including a phase detector responsive to the cyclically phase shifted at line rate subcarrier frequency burst component of a recorder color television signal and a line rate cyclically phase shifted reference subcarrier signal frequency, comprising:
   - means including a filter coupled to the output of said phase detector, said filter being tuned to one-half the line frequency to provide an output signal when the reference phase shifted signal is cyclically out-of-phase with the phase of the television signal subcarrier frequency component;
   - means coupled to the output of said filter for detecting the presence of a predetermined number of cycles of said filter output signal and in response thereto providing a phase error pulse; and
   - means responsive to said phase error pulse and operative to reset the cyclic phase of said reference subcarrier signal so as to synchronize with the cyclic phase of the subcarrier frequency component of said color television signal.

5. The identification circuit as defined in claim 4 wherein said first mentioned means includes:

means for amplifying said filter output signal.

6. The identification circuit as defined in claim 4 and including:

clipping means connected between said first mentioned means and said detecting means for allowing said filter output signal to be applied to said detecting means only when its amplitude exceeds a predetermined level.

References Cited

UNITED STATES PATENTS

| | | |
|---|---|---|
| 3,474,190 | 10/1969 | Bruch. |
| 2,735,886 | 2/1956 | Schlesinger. |
| 3,225,134 | 12/1965 | Jensen. |

ROBERT L. FRIFFIN, Primary Eaxminer

G. G. STELLAR, Assistant Examiner

U.S. Cl. X.R.

178—69.5